United States Patent

Bauer

[11] 4,039,161
[45] Aug. 2, 1977

[54] HIDDEN VORTEX GENERATORS

[75] Inventor: Andrew B. Bauer, Orange, Calif.

[73] Assignee: McDonnell Douglas Corporation, Long Beach, Calif.

[21] Appl. No.: 622,893

[22] Filed: Oct. 16, 1975

[51] Int. Cl.² .................. B64C 3/58; B64C 9/34
[52] U.S. Cl. .................. 244/213; 138/39; 244/199; 244/113
[58] Field of Search .......... 244/41, 42 R, 40 A, 244/42 D, 130, 113, 40 R, 420 A; 138/39, 37; 114/67 R

[56] References Cited
U.S. PATENT DOCUMENTS

| 1,862,421 | 6/1932 | O'Malley | 244/133 |
| 2,800,291 | 7/1957 | Stephens | 114/67 R X |
| 2,852,209 | 9/1958 | Petre | 244/42 D |

FOREIGN PATENT DOCUMENTS

| 595,877 | 4/1960 | Canada | 244/40 A |
| 1,388,143 | 12/1965 | France | 244/42 D |
| 877,346 | 12/1942 | France | 244/42 D |
| 470,528 | 8/1937 | United Kingdom | 244/42 D |

Primary Examiner—Trygve M. Blix
Assistant Examiner—Galen L. Barefoot
Attorney, Agent, or Firm—G. W. Finch; W. J. Jason; D. L. Royer

[57] ABSTRACT

An improvement to the controllability of aircraft wherein vortex generators are connected to a control surface in front of the hinge line of the control surface so that when the control surface is deflected, the vortex generators project into the airstream on the opposite side from the deflecting control surface. The action of the vortex generators causes the airflow to remain attached to the control surface at higher angles of attack than would otherwise be possible thus increasing the lift of the airfoil and control surface.

7 Claims, 8 Drawing Figures

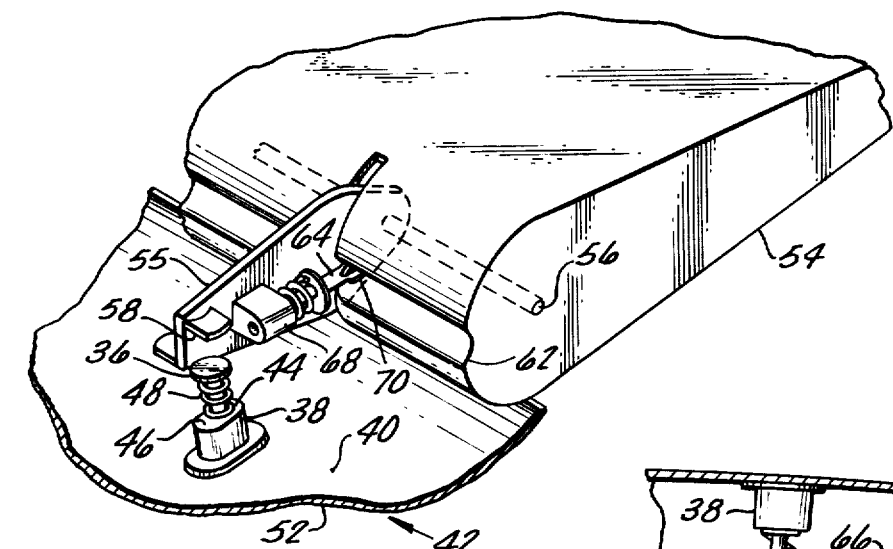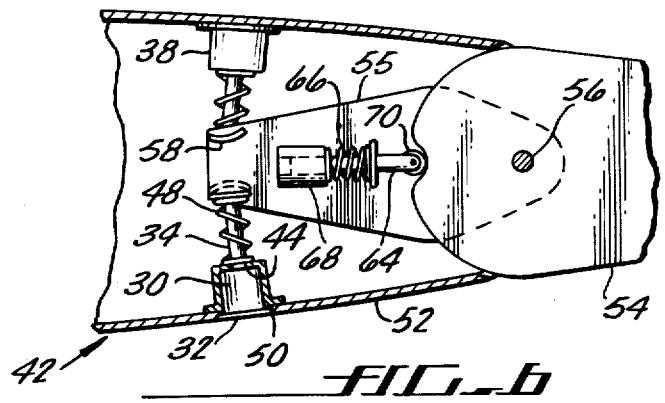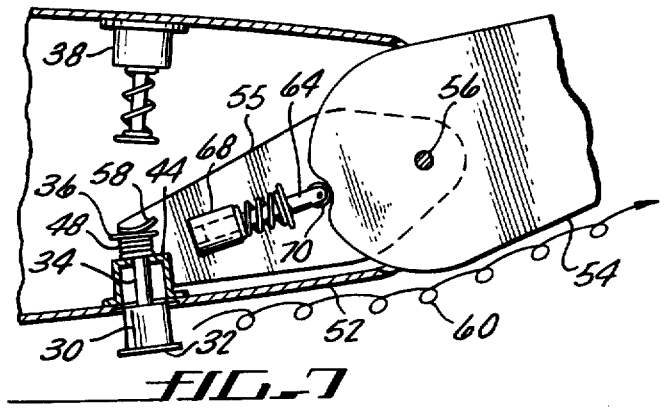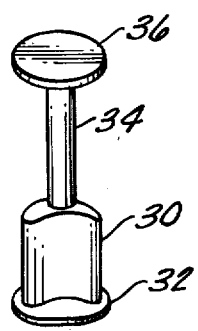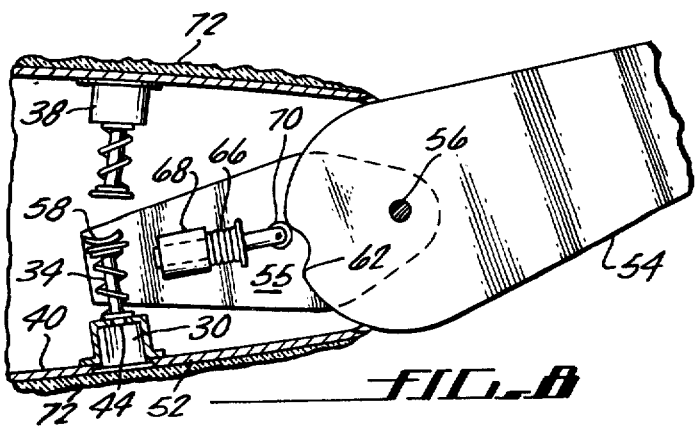

HIDDEN VORTEX GENERATORS

CROSS-REFERENCE TO RELATED PATENTS

The theory of vortex generators is described in U.S. Pat. No. 2,558,816 which issued 3 July 1951 to Hendrikbruynes and is incorporated into this specification as though fully set forth hereinbelow.

BACKGROUND OF THE INVENTION

Vortex generators such as are shown in the above reference patent are well known in the art for their ability to energize the boundary layer flowing over an aerodynamic surface and to cause the air flow to remain attached to the surface. In the years when pioneer turbine aircraft were being designed, it was found that vortex generators were a quick expedient when a separation problem became apparent during flight test. Usually these problems were involved with the aircraft's flap system. However, in some aircraft, vortex generators have been used to increase the effectiveness of the rudder or other control surface which for one reason or another was not as effective as it was originally supposed to be. When the vortex generators are used in conjunction with a control surface, they usually are needed in the high lift regime only, that is, when the aircraft is moving relatively slowly and a large deflection of the control surface is required to maintain the desired flight attitude. A typical example is the rudder deflection required for a multi-engine aircraft when one of the outboard engines is inoperative thereby causing an asymmetric thrust situation. During landing this situation usually requires that the aircraft be flown at a relatively slow speed with almost the entire rudder travel being used to maintain the yaw attitude of the aircraft against the asymmetric thrust. The vortex generators are needed only during the short time the aircraft is being operated with the rudder greatly deflected. However, the drag from the vortex generators, which is substantial especially at cruise, is present during all operating modes of the aircraft. Therefore, various schemes have been proposed such as those shown in STEPHENS, U.S. Pat. No., 2,800,291 or ORNBERG, U.S. Pat. No., 3,471,107 to retract the vortex generators, extending them only during the period they might be needed. Such retracting vortex generators have not gained acceptance due to the complexity and expense of making them retractable.

BRIEF DESCRIPTION OF THE PRESENT INVENTION

The vortex generators of the present invention are combined with the control surface so they are extended into the air stream only during the periods that the control surface is deflected beyond what would normally cause separated flow. The extension and retraction means are associated with the control surface in a simplified fashion so that the increased weight and cost of the system does not approach the other known expedient for providing proper control surface action, that is, providing a bigger or more complex control surface. The main advantage of the present invention is that through its use, the airfoil and control surfaces of aircraft including the flaps can be sized for the normal operating conditions of the aircraft, whereas emergency or other unusual conditions can be accommodated by the retractable vortex generators presently disclosed.

The present vortex generators are normally located beneath the skin of the airfoil surface forward of the control surface hinge line. Extreme deflections of the control surface are transferred to the vortex generators by arms which extend forwardly from the control surface to move them outwardly through their associated holes in the airfoil surface. The generators then generate vortices which assure the boundary layer remains attached to the deflected control surface downstream therefrom. Means are also provided to assure that ice and other contaminants do not adversely effect the operation of the control surface. In addition, means are shown to incorporate the generators in an extremely clean aircraft where open holes cannot be accommodated. This is accomplished through the use of end plates positioned on the vortex generators which seal the holes so that almost no drag is added to the aircraft due to the existence of the vortex generators when they are in their retracted positions. It can also be shown that the drag of even the non-sealed vortex generators is less than the parasitic drag caused by the larger control surface needed when vortex generators are not employed.

It is therefore an object of the present invention to provide means for preventing control surface flow separation during extreme operating conditions of an aircraft without needlessly increasing the drag of the aircraft in its normal configurations.

Another object of the present invention is to provide retraction and extension means for vortex generators which are fail safe.

Another object of the present invention is to provide means which enable a reduction in size of control surfaces required on aircraft to generally make the aircraft lighter and aerodynamically cleaner.

Another object is to provide retractable vortex generators which are relatively economical to manufacture, install and maintain.

These and other objects of the present invention will become apparent to those skilled in the art after considering the following detailed specification which covers preferred embodiments thereof in conjunction with the accompanying drawings wherein:

BRIEF DESCRIPTION OF THE DRAWINGS

FIG. 4 is a perspective view of a movable control surface and a portion of the fixed airfoil surface wherein hidden vortex generators of the present invention are incorporated.

FIG. 5 is a detailed view of one of the vortex generators as shown in FIG. 4.

FIG. 6 is a cross-sectional view of FIG. 4 where the control surface is in a neutral attitude.

FIG. 7 is a view similar to FIG. 6 with a control surface positioned at its extremity of motion.

And FIG. 8 is a cross-sectional view similar to FIG. 6 wherein ice or debris has blocked the movement of the vortex generator.

DETAILED DESCRIPTION OF THE PREFERRED EMBODIMENT

Figure 1:
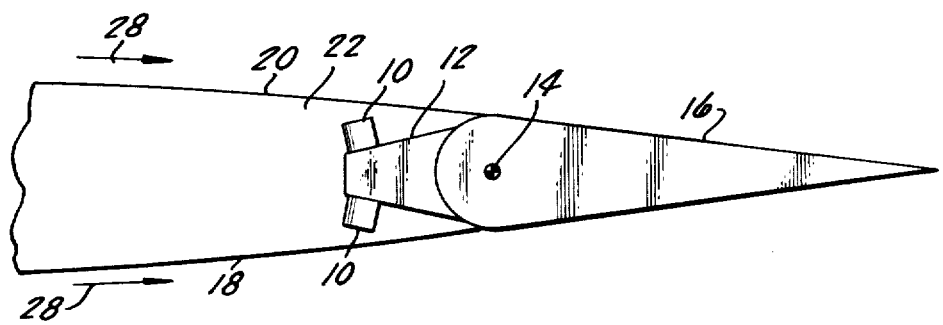
FIG. 1 is a simplified cross-sectional view of a rudder and a portion of its associated vertical stabilizer showing one embodiment of the present invention.
Figure 2:
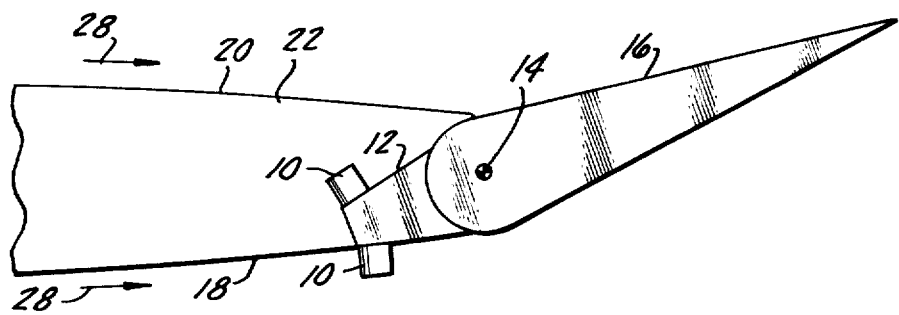
FIG. 2 is a view of the rudder and vertical stabilizer of FIG. 1 in a deflected condition.
Figure 3:
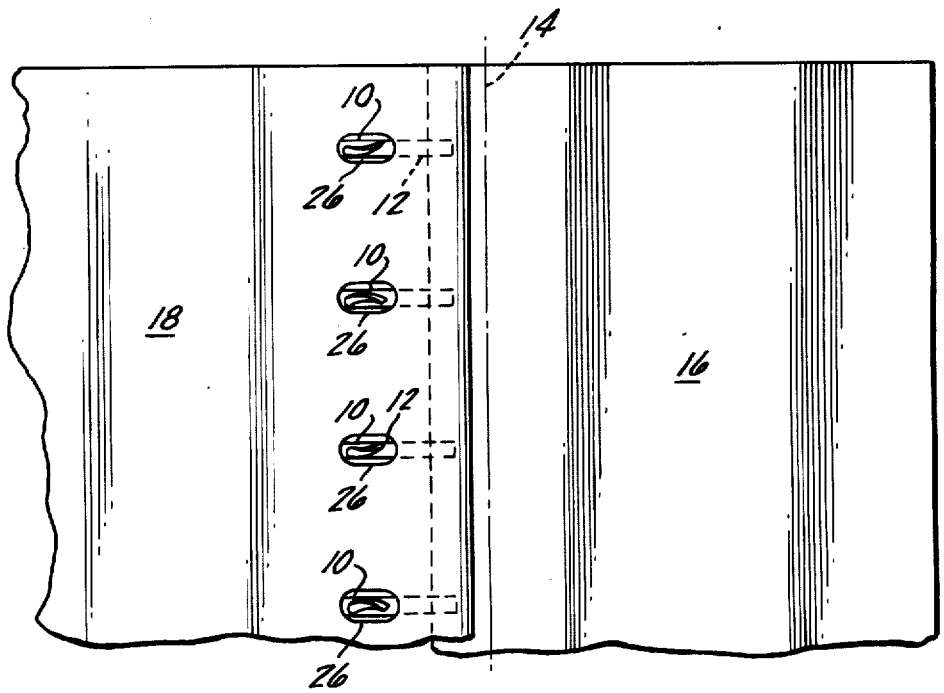
FIG. 3 is a side view of the rudder and vertical stabilizer portion of FIG. 1.

Referring to the drawings more particularly by reference numbers, number 10 in FIG. 1 refers to hidden vortex generators constructed according to the present invention. The generators 10 are mounted on an extension 12 forward of the hinge line 14 of the control surface 16. Although the control surface 16 shown is a rudder, it could be an aileron, flap, elevator, or other similar control surface. Of course, when it is a flap, and in some instances, an elevator, vortex generators 10 would only need to be provided to extend out one side 18 or 20 of the adjacent fixed control surface 22. Normally in the case of a flap, the vortex generators 10 would extend out the upper surface whereas in the case of an elevator they would extend out the lower surface. The generators 10 can be sized to extend out through the side surface 18 or 20 through holes 26 formed therethrough a distance that relates to the size of vortex required to prevent separation from the deflected control surface 16. The vortex generators 10 can be placed at intervals along the length of the control surface 16 as shown in FIG. 3. As can be seen, the vortex generators 10 are small airfoils which extend at right angles into the air stream 28 at a substantial angle of attack to create the vortex desired. Placing the generators 10 at opposite angles of attack as shown in FIG. 3 reduces the possibility of an aircraft trim change during extension thereof due to lift created by the generators 10.

A more complex version of the present invention is shown in FIGS. 4 through 8 in which the vortex generator 30 has a hole sealing end cap 32, an attached sliding stud 34 and an abutment member 36. The vortex generator 30 is normally mounted within a case 38 which is mounted to the inner surface 40 of the fixed portion of the airfoil 42 by suitable means. The case 38 can enclose the vortex generator 30 when it is in its retracted position and when so constructed prevents cross flows through the control surface which otherwise might cause undesirable drag. The cause 38 also provides bearing means 44 in which the stud 34 can slide. An abutment surface 46 is also provided facing the abutment member 36 so that a spring 48, preloaded in compression, can act between the abutment surface 46 and the abutment member 36 to normally maintain the vortex generator 30 in a retracted position with its end cap 32 sealing the hole 50 in the surface 52.

The vortex generators such as generator 30 are operated by movement of the movable control surface 54. When the control surface 54 moves toward an extreme position, an extension forward of the hinge line 56 thereof moves until a sidewardly extending tang 58 engages the abutment member 36 of the vortex generator 30. Thereafter, further movement of the movable control surface 54 forces the vortex generator 30 out into the air stream where it can generate the desired vortex 60. As can be seen, the tang 58 can be located on the extensions spaced from member 36 so that a considerable movement of the control surface 54 is possible before a vortex generator 30 is forced out into the air stream.

The extension 55 is pivoted to the hinge line 56 and can be releasably constrained to move with the movable control surface 54 by suitable means such as the cam 62 and cam follower 64 shown. The cam follower 64 is forced into engagement with the depressed cam 62 in the front surface of the movable control surface 54 by means of a spring 66. The cam follower is slideably mounted in a bearing 68 and may include suitable antifriction means such as a roller bearing 70 at the cam engaging surface thereof. When ice 72 as shown in FIG. 8 or other debris prevents the vortex generator 30 from extending, the cam 62 and follower 64 enable relative movement of the extension 55 with respect to the movable control surface so that no physical damage is done. Since each vortex generator 30 can be independently operated by its adjacent extension 55 and tang 58, one or more vortex generators 30 can be disabled by ice while the others operate without interfering with the normal action of the movable control surface 54.

Thus there has been shown and described novel hidden vortex generator means which fulfill all the objects and advantages sought therefor. Many changes, modifications, variations, and other uses and applications of the subject invention will, however, become apparent to those skilled in the art after considering this specification together with the accompanying drawings. All such changes, modifications, variations and other uses and applications which do not depart from the spirit and scope of the invention are deemed to be covered by the invention which is limited only by the claims which follow.

What is claimed is:

1. A control surface for generating force due to a medium flowing thereover having a leading portion with opposite side surfaces and a trailing portion movable with respect thereto, the improvement comprising:
   movable means for generating vortexes in the flowing medium adjacent the trailing portion, said movable means comprising a plurality of blades of airfoil cross section projecting into the flowing medium, said blades having chord lines inclined relative to the flowing medium to generate vortexes therefrom;
   means to extend and retract said movable means for generating vortexes from at least one of the oposite side surfaces of the leading portion as the trailing portion moves with respect to the leading portion through pre-determined positions;
   a pivot which connects the leading portion to the trailing portion; and
   force responsive means to releasably connect said means to extend and retract said movable means to the trailing portion for rotation about said pivot when counter force preventing said rotation is below a predetermined level.

2. The control surface defined in claim 1 including:
   a plurality of openings defined through at least one of the opposite side surfaces of the leading portion, said
   blades being connected to the leading portion with one blade being positioned adjacent each of said openings defined through at least one of the opposite side surfaces thereof for extension and retraction therethrough.

3. The control surface defined in claim 2 wherein each of said blades is biased to its retracted position.

4. The control surface defined in claim 3 wherein each of said blades includes an abutment surface thereon, said means to extend and retract said blades including abutment surfaces for engaging said blade abutment surfaces to extend said blades as the trailing portion rotates in a predetermined arc.

5. The control surface defined in claim 2 wherein each of said blades include an end plate which extends outwardly beyond the blade side surface and which closes the associated opening in said side surface of the leading portion when said blade is in its retracted position.

6. The control surface defined in claim 1 wheren said force responsive means include:
   at least one lever connected to rotate about said pivot with at least one abutment member connected thereto in position to engage at least one of said blades; and
   releasing means connected between said control surface and said lever which release when counter force preventing said rotation is above said predetermined level.

7. The control surface defined in claim 6 wherein said releasing means include:
   at least one detent cam surface; and
   at least one spring-loaded cam follower which engages said detect cam surface, said cam surface and said follower forming a releaseable connection between said control surface and said lever.

* * * * *